United States Patent [19]
Ciaccio

[11] Patent Number: 5,444,949
[45] Date of Patent: Aug. 29, 1995

[54] COLLAPSIBLE GROUND PIERCING WHEEL ANCHOR FOR MOTOR VEHICLE

[76] Inventor: Rick Ciaccio, 2687 A Orange Ave., Costa Mesa, Calif. 92627

[21] Appl. No.: 217,492

[22] Filed: Mar. 24, 1994

[51] Int. Cl.⁶ .............................. B60T 3/00; B60S 9/00
[52] U.S. Cl. ................................. 52/155; 188/32
[58] Field of Search ............................ 52/155–160, 52/162–166, 146; 188/32

[56] References Cited

U.S. PATENT DOCUMENTS

| | | |
|---|---|---|
| 1,308,939 | 7/1919 | Eggleston . |
| 1,550,276 | 8/1925 | Nilson . |
| 2,903,094 | 9/1959 | Andersen ............................ 188/32 |
| 3,216,159 | 11/1965 | Rooker . |
| 3,387,686 | 6/1968 | Little . |
| 3,500,598 | 3/1970 | Ettinger . |
| 3,647,029 | 3/1972 | Hanley . |
| 3,828,497 | 8/1974 | Vinycomb . |
| 3,973,651 | 8/1976 | Garrett et al. ............................ 188/32 |
| 4,026,080 | 5/1977 | Meikle ................................ 52/159 |
| 4,315,387 | 2/1982 | Lee et al. ............................ 52/162 X |
| 4,363,198 | 12/1982 | Meyer . |
| 4,421,210 | 12/1983 | Sugino ................................ 188/32 |
| 4,825,604 | 5/1989 | Manning . |

Primary Examiner—Carl D. Friedman
Assistant Examiner—Robert J. Canfield

[57] ABSTRACT

A collapsible wheel anchor having a ground (G) penetrating blade (10) attached to an upper support member (A) by removable attaching means, A base support member (B) is temporarily engaged at the lower portion of upper support member (A) by two forward protruding tabs 7 passing through corresponding apertures, Upper support member (A) and lower support member (B) are linked at each end by two elongated struts (28) and (26) pivotally attached by hinging means forming a wedge-shaped structure of open form for receiving a vehicle wheel (15).

10 Claims, 5 Drawing Sheets

COLLAPSIBLE GROUND PIERCING WHEEL ANCHOR FOR MOTOR VEHICLE

BACKGROUND

1. Field of Invention

This invention relates to ground anchors, particularly to a wheel anchor apparatus and method for use with a winch on a motor vehicle.

2. Description of Prior Art

Ground anchors of various types are highly useful for back road and off road operations, in which mud holes, sand, snow drifts and steep grades, with low traction are all encountered again and again.

It is common practice to provide vehicles used under any of the above mentioned conditions with a power winch mounted on the front thereof, comprising a cable and a winding drum, together with a suitable drum driving means, such as a geared down electric motor, or mechanical drive connections from the vehicle motor for the purpose of winching the vehicle when it is unable to progress under its own power, or pulling out a stuck vehicle. Also, there are portable vehicle power winches which can be used to pull items such as vehicles, logs, game animals, etc. across terrain.

Quite frequently a tree may be available for anchorage, but since the availability of a suitable tree cannot be depended upon, a compact and effective anchoring system, capable of employing the ground for temporary anchorage, is extremely useful.

Several types of ground anchors have been proposed. Examples of known anchor systems are shown in U.S. Pat. Nos. 1,308,939 to Eggleston (1919); 1,550,276 to Nilson (1925); 3,216,159 to Rooker (1965); 3,500,598 to Ettinger (1970); 3,828,497 to Vinycomb (1974); 4,363,198 to Myer (1982) and 4,825,604 to Manning (1989). These types of ground anchors have been used for various purposes. However, these types of anchors had and still have significant disadvantages. For example, some of such anchors are difficult to insert into the ground. Particularly, they are ineffective in loose sand or mud, must be assembled for use, or require a separate pounding member to set the anchoring element. Others are intended for use as more or less permanent anchoring (e.g., to anchor a guy wire used to support a telephone or power pole or large post). Still others are intended for light duty use where the force applied to the anchor is usually not very substantial.

U.S. Pat. No. 3,500,598 to Ettinger (1970) discloses a ground anchor with spikes serving as anchoring elements; however, such spikes comprise insufficient surface area to resist being pulled through loose sand or mud. Also, the spikes must be impacted into the ground, thus are difficult to remove after use. U.S. Pat. No. 3,828,497 to Vinycomb (1974) shows a fluke type ground anchor; the anchoring element depends upon acute angle positioning and substantial pulling force to penetrate the ground. These types of anchors are usually quite large and of heavy construction. U.S. Pat. No. 4,363,198 to Meyer (1982) shows adjoined spade embers impacted into the ground; such types of ground anchors will not withstand substantial load forces typically generated by modern winches.

There has not been provided a collapsible, easy to use ground anchor which is contiguous in placement to firmly support a motor vehicle in type or condition of earth for the purpose of winching or stabilizing. Particularly, which is self inserting, self loading, easily removed from the ground, and packed away in the vehicle for future use. More particularly, which requires no special tools for use.

OBJECTS AND ADVANTAGES

Accordingly, several objects and advantages of my invention are:

(a) to provide a ground anchor which can be collapsed to a compact flat position after use and stored in the vehicle for future use;

(b) to provide a ground anchor which is both light in weight and forms a rigid structure when unfolded for use;

(c) to provide a ground anchor which does not require prior assembly, thus is easy to use;

(d) to provide a ground anchor which does not require special tools for use;

(e) to provide a ground anchor which is adjustable for use in all types of earth, under all conditions, and with all types of off road vehicles;

(f) to provide a ground anchor which is both self aligning and self inserting into the earth;

(g) to provide a ground anchor which is contiguous in placement to the vehicle wheel;

(h) to provide a ground anchor which employs contiguous forward motion of the vehicle wheel as a means for ground penetration;

(i) to provide a ground anchor which longitudinally multiplies earth-engaging torque as winch pulling resistance increases, thereby producing greater intimacy between the ground anchor and earth;

(j) to provide a ground anchor which is readily and easily removed from the ground after use;

(k) to provide a ground anchor which when in contact with moisture or other elements is non corrosive.

Further objects and advantages of my invention will become apparent from a consideration of the drawings and ensuing description.

Figure 1:
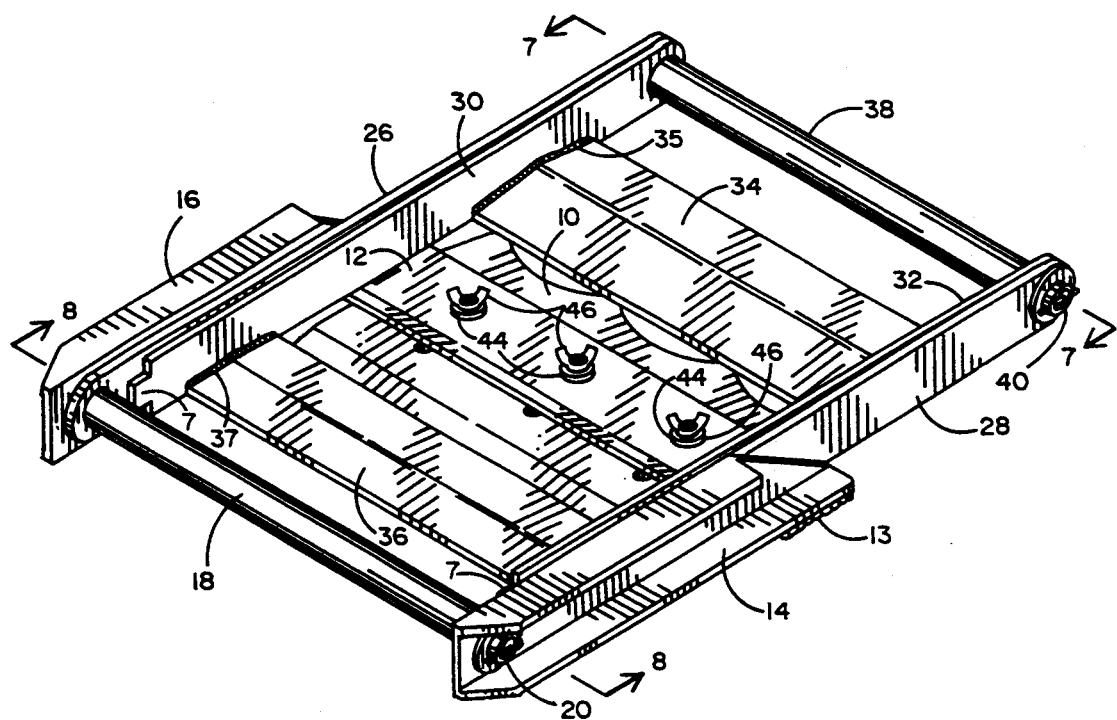
FIG. 1 is a perspective view of the ground anchor shown in a collapsed position for storage and transportation.

| Reference Numerals in Drawings | |
| --- | --- |
| 7 tab | |
| 10 blade | 12 plate |
| 13 weld | 14 support |
| 15 wheel | 16 support |

-continued

| Reference Numerals in Drawings | |
|---|---|
| 17 aperture | 18 spacer tube |
| 19 aperture | 20 tube |
| 22 washer | 24 drift pin |
| 26 strut | 28 strut |
| 30 rail | 32 rail |
| 34 brace | 35 weld |
| 36 brace | 37 weld |
| 38 spacer tube | 40 tube |
| 42 bolt | 44 washer |
| 46 wing nut | A member |
| B member | G ground |

DESCRIPTION—FIGS. 1 to 8

Figure 2:
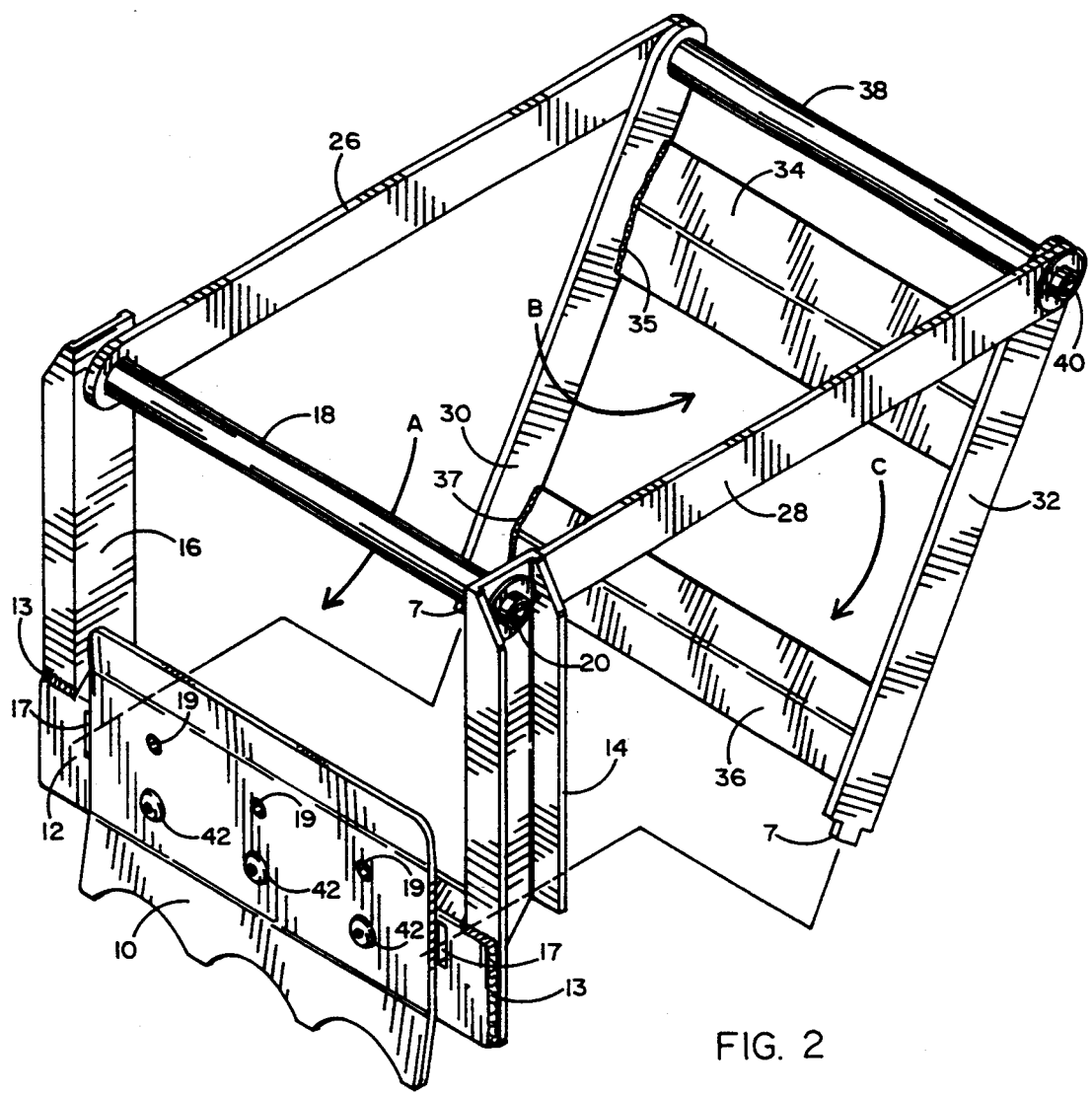
FIG. 2 is a perspective view of the ground anchor illustrating the unfolding action to the operative configuration.

Referring to FIGS. 1 and 2 a perspective is shown of the preferred embodiment of the ground anchor illustrating the pivotal displacement of the movable members, both in the collapsed and intermediate positions respectively. The first upper movable member A comprises a first side vertical strut, pylon, or support 14 which may be of generally U-shaped channel or construction. Near the upper edge of support 14 is an aperture, and at the lower portion is shown a beveled section that tapers downward approximating 40° to form a forward cusp. This cusp serves as a ground piercing element as explained hereinafter. A second support 16 of similar construction is disposed in parallel opposed relation to support 14. A transverse plate 12 is joined to the lower front face of support 14 and support 16 in a suitable way such as welding 13 at opposite ends of the confronting faces with the lower edge surfaces of support 14, support 16, and plate 12 being relatively flush.

Plate 12 should be composed of hard, tough, resilient metal, and should be of sufficient thickness to be rigid, and to sustain the load forces which are applied to it without permanent distortion, and without substantial temporary deformation, but it should not be any heavier than necessary for meeting these requirements. To minimize deformation under load, a transverse, rear-facing obtuse angle approximating 48° and thirteen millimeters or one-half inch in width is formed at the upper portion of plate 12 for reinforcement. A notch is provided at opposite ends of plate 12 from the upper edge extending downward to a point just below the radius of the bend and inward equally to allow proper positioning of distance between support 14 and support 16. The angled flange between support 14 and support 16 as described serves to add rigidity to the frame, and also acts as a limit stop for the pivotally mounted movable members as explained hereinafter.

Figure 8:
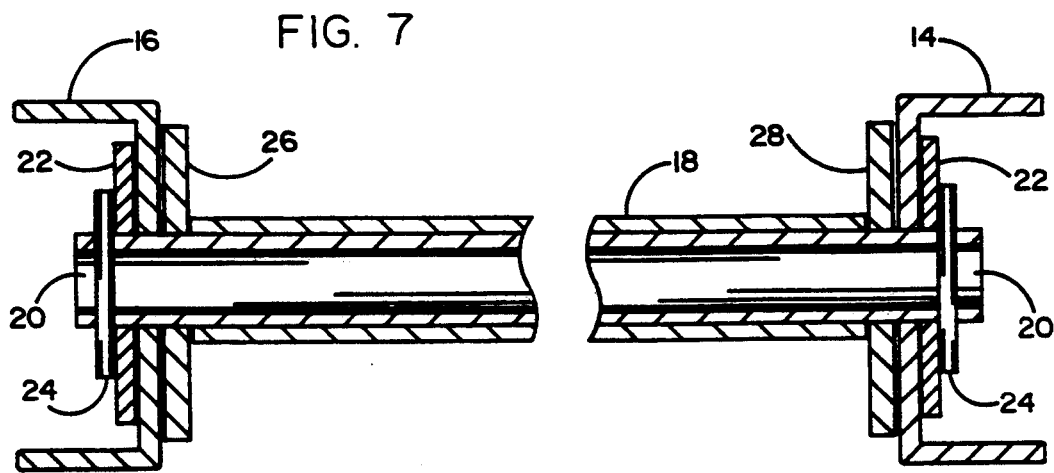
FIG. 8 is a sectional view taken along a plane passing through section line 8—8 of FIG. 1.

Attached to the upper portion of member A is an elongated first connector, link, or strut 28. The ends of strut 28 are radiused to eliminate protruding corners during rotation and there is an aperture at each end. A second Strut 26 of similar construction is disposed in parallel relation to strut 28. Referring to FIG. 8, both strut 28 and strut 26 are pivotally attached between support 14 and support 16 by a cross-shaft, or tube 20 passing through the aperture of support 14, through the forward aperture of strut 28, continuing through a full-width spacer tube 18 surrounding and rotatable on such cross-shaft, through the forward aperture of strut 26, and through the aperture of support 16. Tube 20 is secured by a clip, or drift pin 24 passing laterally through it at opposite ends. Positioned at each end of tube 20 is a flat round spacer, or washer 22 between drift pins 24, support 14 and drift pins 24 and support 16 to prevent drift pins 24 from galling the mating surfaces when rotated. Drift pin 24 and washer 22 should be composed of non-corrosive stainless steel.

As shown in FIG. 2, Strut 28, and strut 26, longitudinally extend rearward and pivotally attach to a second movable member B comprising a first rail 32 which has both an aperture and a radius at the pivotally connecting end to conform to the pivotal end of strut 28. The opposite end is notched at opposing corners forming a stepped down forward-protruding tab 7. A second rail 30 of similar construction is disposed in parallel relation to rail 32. Rail 30 and rail 32 are transversely joined by a V-shaped first brace 34 in a suitable way such as welding 35. A second brace 36 of similar construction is disposed in parallel relation to brace 34 and is joined by welding 37. Brace 34 and brace 36 comprise a rectangular plate with a transverse central bend approximating 10° for rigidity. In the joined position brace 34 and brace 36 are splayed downward, thus resist axial deflection under load caused by an uneven ground surface and downward pressure from the vehicle wheel. Both braces are proximally positioned.

Figure 7:
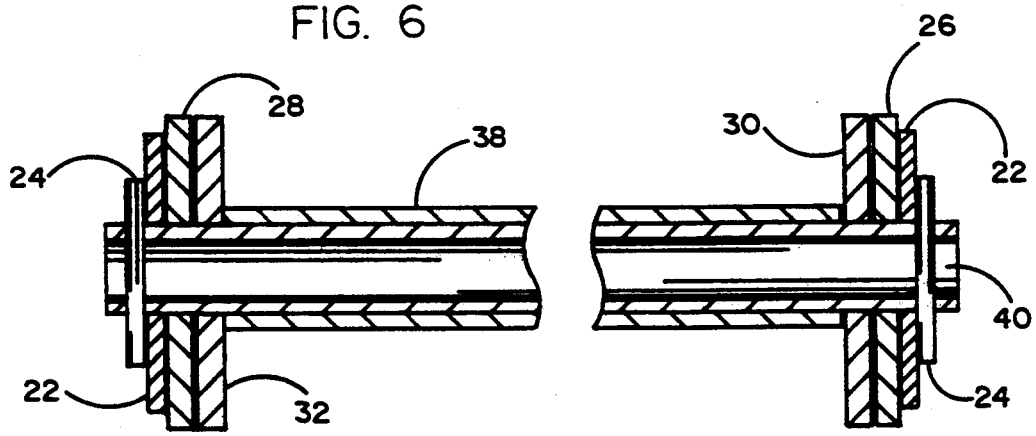
FIG. 7 is a sectional view taken along a plane passing through section line 7—7 of FIG. 1.

Referring to FIG. 7, the second member B is pivotally attached between the rear portions of strut 28 and strut 26 by a cross-shaft, or tube 40 passing through the rear aperture of strut 28, through the aperture of rail 32, continuing through a full-width spacer tube 38 surrounding and rotatable on such cross-shaft, through the aperture of rail 30, and through the rear aperture of strut 26. Tube 40 is secured at opposite ends by a clip, or drift pin 24 passing laterally through it. Positioned at each end of tube 40 between drift pins 24 and strut 28, and drift pins 24 and strut 26 and strut 26 is a flat round spacer, or washer 22, to prevent drift pins 24 from galling the mating surfaces when rotated.

FIG. 1 shows the ground anchor with the pivotally mounted members rotated to their respective nesting positions for storage. The movable members nest in horizontal relation, intersecting at the rear edge of the angled flange on plate 12. The flange serves as a mechanical limit stop as previously mentioned. A narrow webbing (not shown) is looped around the nested horizontal elements and secured by a buckle, snap, or hook and loop type fastener. It should be noted that the dimensional width of member B, and the distance between strut 28, and strut 26 as they pivotally attach to member A varies by approximately thirteen millimeters, or one half-inch. Such dimensional difference forces strut 28 and strut 26 to taper inward in a V relation as they pivotally extend to member B. The purpose of the dimensional difference is to allow substantial space between the movable members in the nested position. Should permanent distortion of one, or all movable members occur, the ground anchor may still be folded to the collapsed position without interference.

Figure 3:
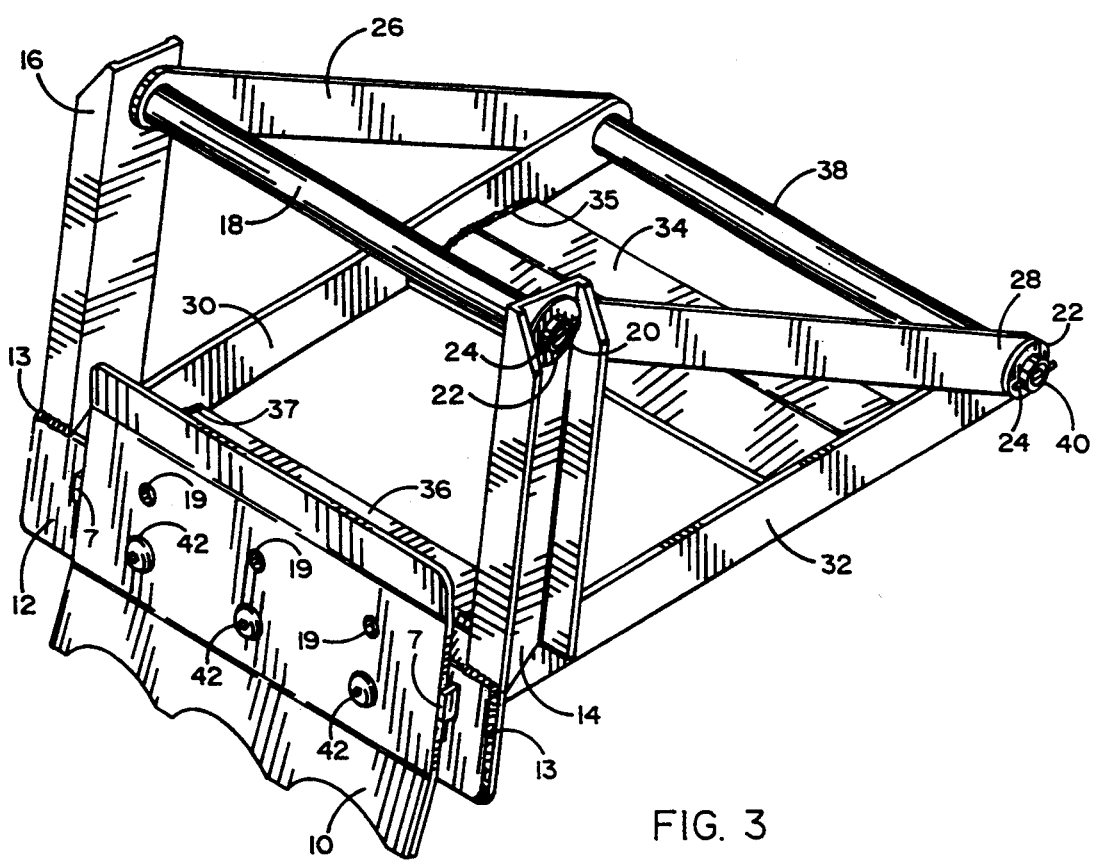
FIG. 3 is a perspective view of the ground anchor in a fully operative configuration and ready for use.

FIG. 2 illustrates how the movable members rotate to their operational positions respectively. Member A swings downward from the nested horizontal position in a forward arc as shown by arrow A as member B swings downward from the nested horizontal position in a rearward arc as shown by arrow B. Arrow C shows the motion of strut 28, and strut 26 as they pivot downward in unison as member A remains substantially vertical. The forward protruding tabs 7 provided at the end of rail 32, and rail 30 are guided forward, and inserted through two apertures 17 provided in plate 12 as illustrated by the drawing guidelines. Apertures 17 are proximal in location, and correspond in shape and size with the cross-sectional dimensions of the protruding tabs so that each tab 7 is guided by the walls of the associated aperture 17 when inserted, and each aperture 17 so restricts movement of the tab 7 which it receives, relative to plate 12, that the tabs 7 cannot be substantially dislodged during use, and which are held firmly in place as described hereinafter. FIG. 3 shows the ground anchor in the operative configuration in which the tabs 7 are fully inserted, and protrude beyond the front surface of plate 12.

As illustrated in FIGS. 1 and 2, the triangular-shaped structure of the ground anchor as described employs an anchoring device comprising a rigid transversely extending plate, or blade 10, composed of similar metal as plate 12 and of sufficient thickness to resist excessive deformation under load. For the purpose of receiving attaching elements, blade 10 is formed with a plurality of equally-spaced apertures 19 so that it can be adapted to similarly spaced apertures in plate 12. A plurality of threaded bolts 42 pass through apertures 19 of blade 10, and continue through the apertures of plate 12. Bolts 42 are secured by a plurality of flat round washers 44, with a plurality of fasteners, or wing nuts 46 threaded thereon. Wing nuts 46 are preferred, since they can be loosened by hand and require no tools. Bolt 42 washer 44, and wing nut 46 should be composed of non-corrosive stainless steel. Blade 10 is transversely central in location, and has sufficient transverse extent to permit the apertures 19 to be substantially spaced from one another, thus load force is equally distributed throughout the body of member A.

Blade 10 embodies two separate anchoring edges. FIGS. 2 and 3 show a transverse, forward-angled flange approximating 5° and twenty-five millimeters or one inch in width formed in blade 10. At the opposite edge a transverse, forward-angled flange approximating 100 and fifty millimeters or two inches in width is formed, and a plurality of equally-spaced radii are cut from blade 10 forming a plurality of equally-spaced ground piercing elements. Apertures 19 are positioned in two parallel horizontal rows in the center portion of blade 10. Plate 12 is formed with a single horizontal row of apertures. Apertures 19 are symmetrical so that blade 10 may be fastened in four different configurations. Blade 10 may be raised, or lowered, depending upon which row of apertures 19 is used, thus changing the length of the downward-protruding; earth-engaging portion extending beyond the lower edge of member A. Also, blade 10 can be horizontally rotated 180° to facilitate use of the opposite edge, and adjusts up or down in the same manner. The forward-angled straight edge is effective as a plowing element in loose sand or mud, and the forward-angled serrated edge is particularly effective as a ground piercing element on hard-packed earth or ice. The forward angle at each working edge also serves as a stiffening element for rigidity.

OPERATION—FIGS. 1, 2, 3, 4, 5, 6

The ground anchor is of such size and dimensions so as to allow it to be carried inside a motor vehicle in a suitable storage container such as a flexible bag, or mounted on a fixed bracket or similar coupling element. Referring to FIG. 1, when it is desired to utilize the ground anchor it is removed from its container or mounting apparatus; the looped webbing strap (not shown) is removed to free the ground anchor members allowing them to pivot to their respective operating positions as shown in FIG. 2.

A second embodiment of the webbing element (not shown); used to secure the wheel anchor in the collapsed position for storage; could be a round pin of the locking type inserted laterally through concentric apertures in support 14, strut 28, and rail 32. The pin could be attached permanently to the ground anchor by a small linked chain element or cable passing through a designated aperture in support 14. The locking pin would be pulled from the inserted position to free the pivoting members.

As illustrated in FIG. 2, member A is pivoted downward on tube 20 in a forward arc as shown by arrow A to the vertical position. With member A out of the way, member B is free to pivot on tube 40 downward in a rearward arc as shown by arrow B to a slightly angled position. As strut 28 and strut 26 pivot downward in unison as shown by arrow C, member B is guided upward and the protruding tabs 7 at the end of rail 32 and rail 30 are guided forward into corresponding apertures 17 located in plate 12. Plate 12 engages in intimate contact against the stepped ends of rail 32 and rail 30 with the tabs 7 protruding from the opposite side of plate 12 as shown in FIG. 3. The tabs 7 are longer than necessary to insure that they remain in place should the ground anchor members move independently of one-another during use.

A second embodiment of both tube 20, and tube 40, could employ a solid round bar, or tube of which the ends are flush with their respective outer mating surfaces, and secured by a flat round washer of relatively larger outside diameter; a transversely threading bolt passing through an aperture of corresponding size is mounted thereon. However, there would be no functional advantage from this configuration.

A second embodiment of member B could comprise a metal trough of similar dimensions, which is notched in the appropriate locations, has pierced apertures, and 90° flanges formed at opposite sides, thereby replacing rail 32 and rail 30. Raised stiffening elements may be formed from the underside by a stamping or pressing process for rigidity. This type of construction, though simple, would offer no functional advantage.

Shown in FIG. 3, is the ground anchor ready for placement ahead of the vehicle tire. It is required that blade 10 be adjusted in the manner previously described prior to use. However, a common set-up generally may be found with some experimenting. For example, if the ground anchor is to be used on a hard-packed earth surface or ice, blade 10 could be adjusted to the configuration as shown with the serrated edge pointing downward for piercing. If the ground anchor is to be used in sand, or mud, blade 10 could then be rotated 180° with the straight edge pointing downward. More or less plowing action is provided in both configurations depending upon which row of apertures 19 is used, (e.g. raising or lowering blade 10 in relation to plate 12). The acute angle formed at each working edge of blade 10 serves as a stiffening element and enhances the earth scooping and penetrating ability when the ground anchor is in forward motion.

Various embodiments of blade 10 could include a flat or angled anchoring element of varying dimensions and edge contour; an integrated composite gripping element at one edge for use on a paved surface, with the opposite edge contoured for use in earth; a removable cleat, or shoe positioned on the blade specially configured for gripping a paved or other surface. Each embodiment of blade 10 as described would adapt the attached ground anchor apparatus to be used on various ground surfaces. It should be noted that the forward-tapered cusp at the lower portion of support 14 and support 16 as previously referred to, also serves as an earth penetrating element, thus enhances overall performance.

Figure 4:
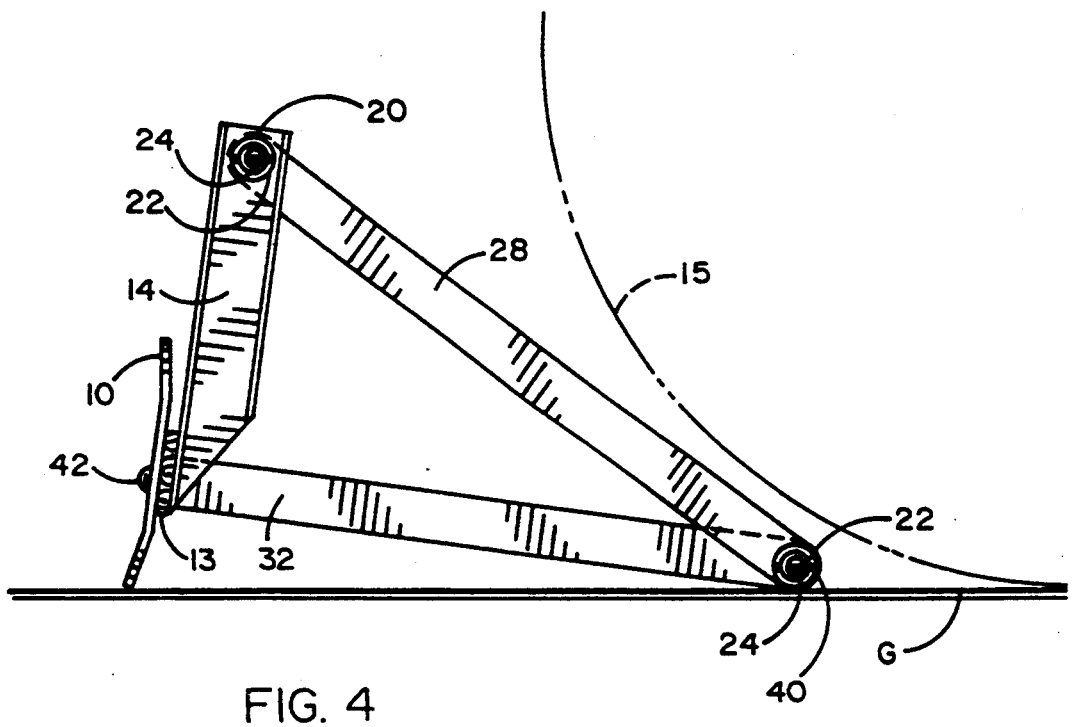
FIG. 4 is an elevational side view of the ground anchor in the anticipated position in relation to the vehicle wheel.
Figure 5:
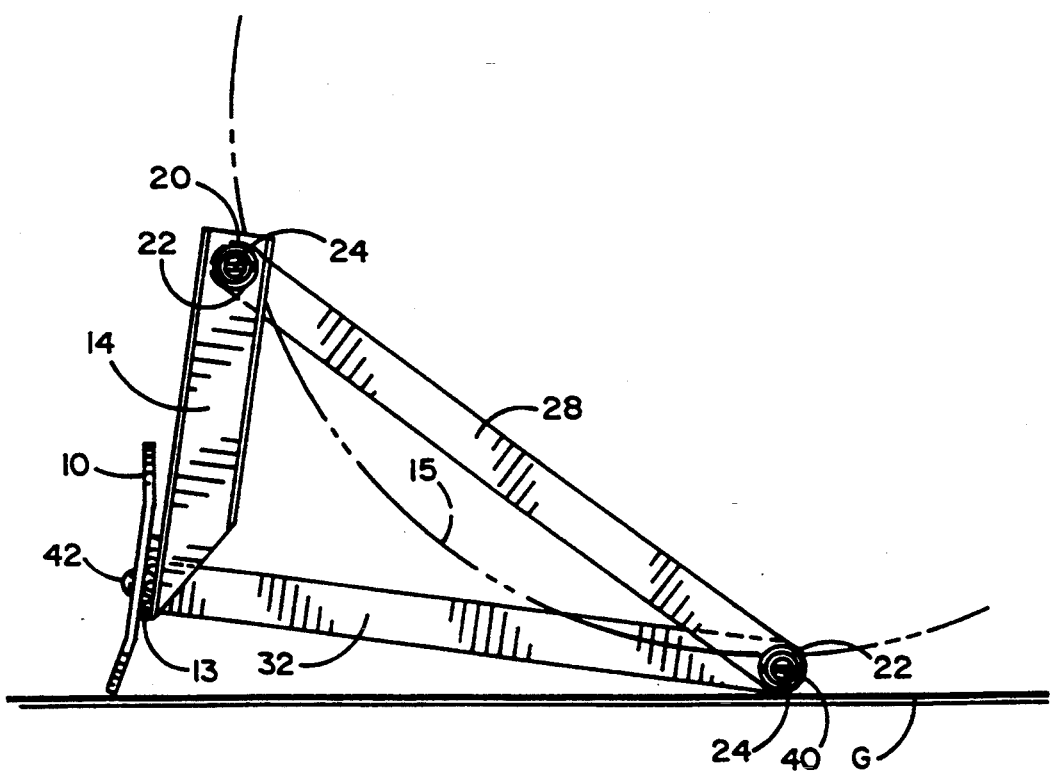
FIG. 5 an elevational side view of the ground anchor with the vehicle wheel contiguously positioned.

As illustrated in FIG. 4, the fully configured ground anchor is positioned in the anticipated position resting on a ground G surface longitudinally ahead of a vehicle wheel 15. The vehicle is then rolled forward. As shown in FIG. 5, wheel 15 contacts spacer tube 38, which is supported by tube 40 passing through it. The weight of the vehicle is distributed through tube 40 into member B, thereby holding the ground anchor in place on ground G as wheel 15 rolls over spacer tube 38 and continues forward into an open area between strut 28, and strut 26. Should the ground anchor become longitudinally mis-aligned, intimate contact between either side of wheel 15, and strut 28 or strut 26 will force wheel 15 and the ground anchor into proper alignment. Tangential contact between the arc portion of wheel 15 and spacer tube 18 occurs as wheel 15 continues forward. The forward momentum of the vehicle as wheel 15 strikes spacer tube 18, transfers mechanical energy through tube 20 into member A.

The ground anchor pivots downward on tube 40 which acts as a floating fulcrum. Blade 10 being secured to member A is driven into ground G. The depth of penetration depends upon the firmness of ground G and the striking force of wheel 15. The combined forces of wheel 15 pushing forward against spacer tube 18 and downward against spacer tube 38 simultaneously; increases intimate contact between member A and member B, which are solidly engaged at plate 12.

Figure 6:
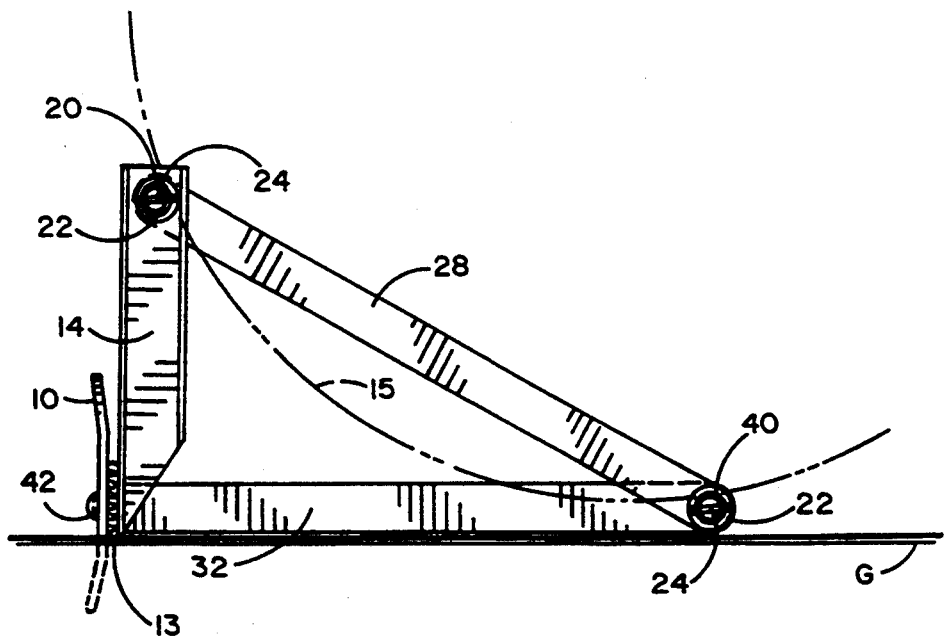
FIG. 6 is an elevational side view of the ground anchor transversely embedded into the ground and ready for use.

The ground anchor is now embedded in ground G and ready for use. The ground anchor may be used to retrieve a vehicle which is immobilized in sand, mud, snow, or other medium, or to pull a log, or other heavy object across terrain through the use of a vehicle mounted winch. A winch pulling cable is un-spooled away from the winch-equipped anchored vehicle and linked to a stuck vehicle or object to be moved. The winch pulling cable is shortened as the winch winding drum is rotated in the reverse direction. As the winch pulling cable is drawn tight, the vehicle wheel 15 is drawn against spacer tube 18 of the ground anchor apparatus progressively harder as pulling resistance increases. Tube 20, being solidly linked to tube 40 by strut 28 and strut 26 forces the rigid ground anchor to torsionally pivot downward, causing greater intimacy between the ground anchor and earth until blade 10 is fully embedded, and member B is resting horizontally against ground G surface as shown in FIG. 6.

As pulling resistance further increases, anchorage depends upon the firmness of ground G. The ground anchor will tend to plow forward at an inclined angle as blade 10 displaces earth, thus entrenching itself. Once entrenched, compaction of displaced earth serves as sufficient anchorage.

On occasion, an earthen surface of particularly loose texture, or mud, and of extreme depth, may be encountered. To prevent excessive inclination of the ground anchor when used in such earth, a restricting device (not shown) which forms no part of the ground anchor is employed comprising a short webbing, cable, or sling, attached to spacer tube 18 by a hook or suitable linking element at each side of wheel 15 forming a loop. A webbing, or cable of sufficient length may then be linked to the loop center, forming a Y-shaped harness. The harness contiguously extends over the radius of wheel 15 and attaches to the vehicle frame or body by an adjustable hook, or suitable element. Such type of harness restricts torsional pivoting, and holds the ground anchor in a fixed inclined position as pulling resistance increases, thereby allowing a more gradual displacement of earth, and deeper entrenchment.

The ground anchor may also be employed for use with a vehicle that is not winch-equipped. Such vehicle serving as a stationary object to which an immobilized winch-equipped vehicle may attach its winch pulling cable. The winch pulling cable is shortened by reverse rotation of the winch winding drum and anchoring occurs in the manner previously described.

After use the vehicle is rolled in the reverse direction. Wheel 15 disengages the ground anchor apparatus, which may be easily, and readily removed from ground G and re-folded to the collapsed position for storage and future use.

CONCLUSION, RAMIFICATIONS, AND SCOPE OF INVENTION

Accordingly, the reader will see that the ground anchor of the invention provides a highly reliable, collapsible, easy to use device that requires no pre-assembly or special tools, and is effective on any earthen surface to pull a vehicle out of a stalled condition as often as required when used in conjunction with a vehicle mounted winch.

While this invention has been described with particular reference to the construction shown in the drawings which contain many specificities, these should not be construed as limitations, but only illustrative of the principles of the invention. Further, since numerous modifications and changes will readily occur to those skilled in the art, it is not desired to limit the invention to the exact construction and operation shown and described, many other variations are possible. For example, for heavier duty use, or wheels of larger diameter and width, all the dimensions of the ground anchor may be proportionately increased; the number of blade mounting apertures may be increased; the ground anchor may be constructed of steel for high strength and coated with paint, or other suitable corrosion protecting element; the ground anchor may be constructed of aluminum alloy for light-weight and anodized for corrosion protection; the ground anchor may be constructed of aluminum alloy with the contiguous load bearing components constructed of steel; the movable members may be formed of reinforced fiberglass, or similar material.

Thus the scope of the invention should be determined by the appended claims and their legal equivalents, rather than by the examples given.

I claim:

1. A collapsible wheel anchor for restraining a motor vehicle, comprising:
   (a) a penetrating means of predetermined shape and size for piercing and displacing an earth surface,
   (b) an upper frame member joined to said penetrating means by an attaching means,
   (c) a base frame member disposed in substantial horizontal relation to said upper frame member, with said frame members being joined by an engaging means, (d) said frame members are linked by a pair of elongated struts disposed on each side thereof by a hinging means and in spaced relation so as to be able to support said members in a rigid, open triangular orientation.

2. The wheel anchor of claim 1 wherein said earth penetrating means is symmetrical for adjusting to one of a predetermined number of operational positions.

3. The wheel anchor of claim 2 wherein said earth penetrating means forms a row of piercing elements in spaced relation.

4. The wheel anchor of claim 3 wherein said piercing elements are formed at an acute angle in relation to said upper frame member.

5. The wheel anchor of claim 2 wherein said earth penetrating means forms a straight edge.

6. The wheel anchor of claim 5 wherein said straight edge is formed at an acute angle in relation said upper frame member.

7. The wheel anchor of claim 1 wherein said attaching means employs a set of bolts with male threads, with a set of female threaded nuts mated thereto.

8. The wheel anchor of claim 1 wherein said hinging means contains a cross shaft mounted through said members and said struts and spans between the sides thereof.

9. The wheel anchor of claim 8 wherein said cross shaft employs a substantially full width tube surrounding and rotatable on said cross shaft, whereby said members and said struts are disposed in a predetermined position.

10. The wheel anchor of claim 1 wherein said engaging means employs, a set of tabs incorporated into and protruding longitudinally from said base frame member, which are inserted through a set of apertures of corresponding shape and size in said upper frame member.

* * * * *